United States Patent [19]

Kawase et al.

[11] 4,257,623
[45] Mar. 24, 1981

[54] SUPPORTING STRUCTURE FOR A SUSPENSION MEMBER FOR A VEHICLE

[75] Inventors: Mitsuo Kawase; Hiroyuki Watanabe, both of Toyota, Japan

[73] Assignee: Toyoda Jidosha Kogyo Kabushiki Kaisha, Toyota, Japan

[21] Appl. No.: 41,881

[22] Filed: May 23, 1979

[30] Foreign Application Priority Data

Jun. 2, 1978 [JP] Japan .............................. 53-75847[U]

[51] Int. Cl.$^3$ ................................................ B60G 7/00
[52] U.S. Cl. ................................... 280/660; 280/662; 280/666; 280/671; 280/701
[58] Field of Search ............... 280/693, 696, 698, 701, 280/716, 93, 660, 96.1, 663, 666, 662; 267/20 R, 60, 63 R

[56] References Cited

U.S. PATENT DOCUMENTS

| | | | |
|---|---|---|---|
| 3,075,786 | 1/1963 | Freers | 280/666 |
| 3,181,882 | 5/1965 | Rosky | 280/666 |
| 3,580,593 | 5/1971 | Sprunger | 280/716 |

*Primary Examiner*—Robert R. Song
*Attorney, Agent, or Firm*—Oblon, Fisher, Spivak, McClelland & Maier

[57] ABSTRACT

A supporting structure for a suspension member on a vehicle includes a front cushion and a rear cushion provided between the suspension member and the body of the vehicle. The front cushion is designed with a small spring rate against a load acting longitudinally on the vehicle and a vertical load on the vehicle. The rear cushion provides a large spring rate against a vertical load on the vehicle.

5 Claims, 5 Drawing Figures

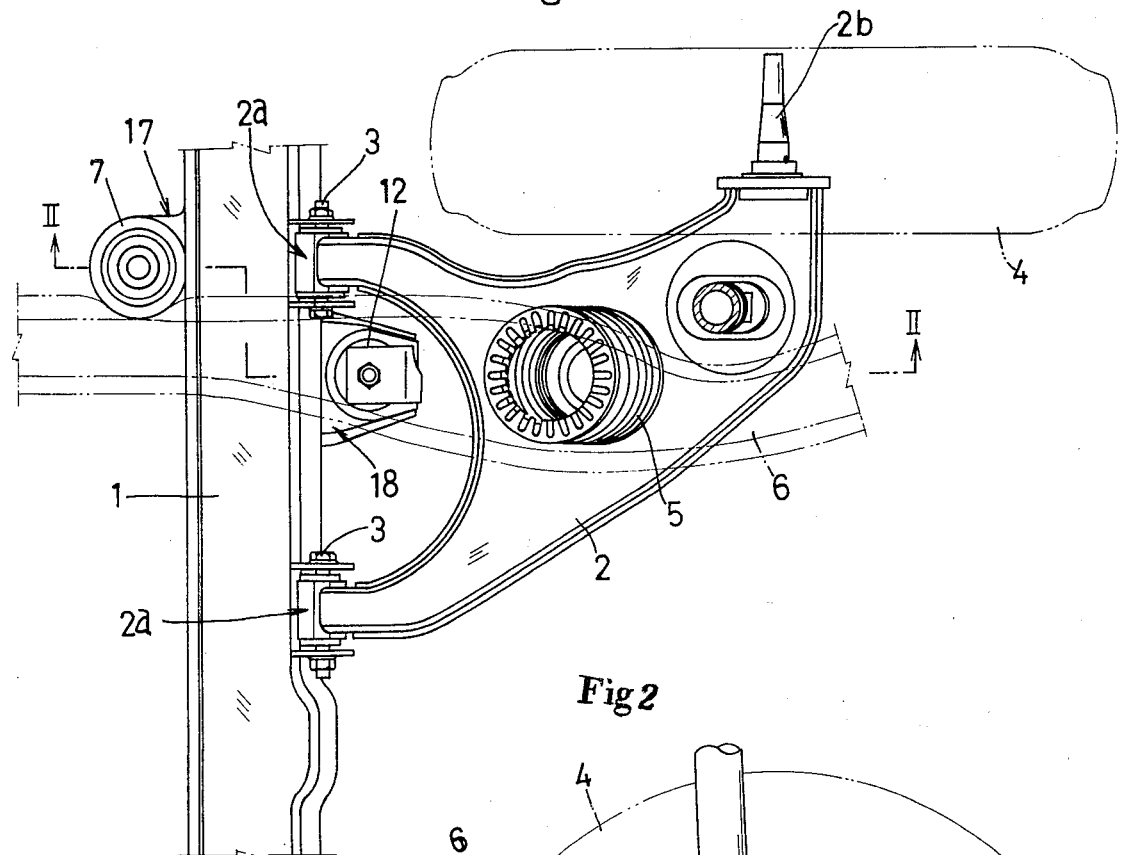
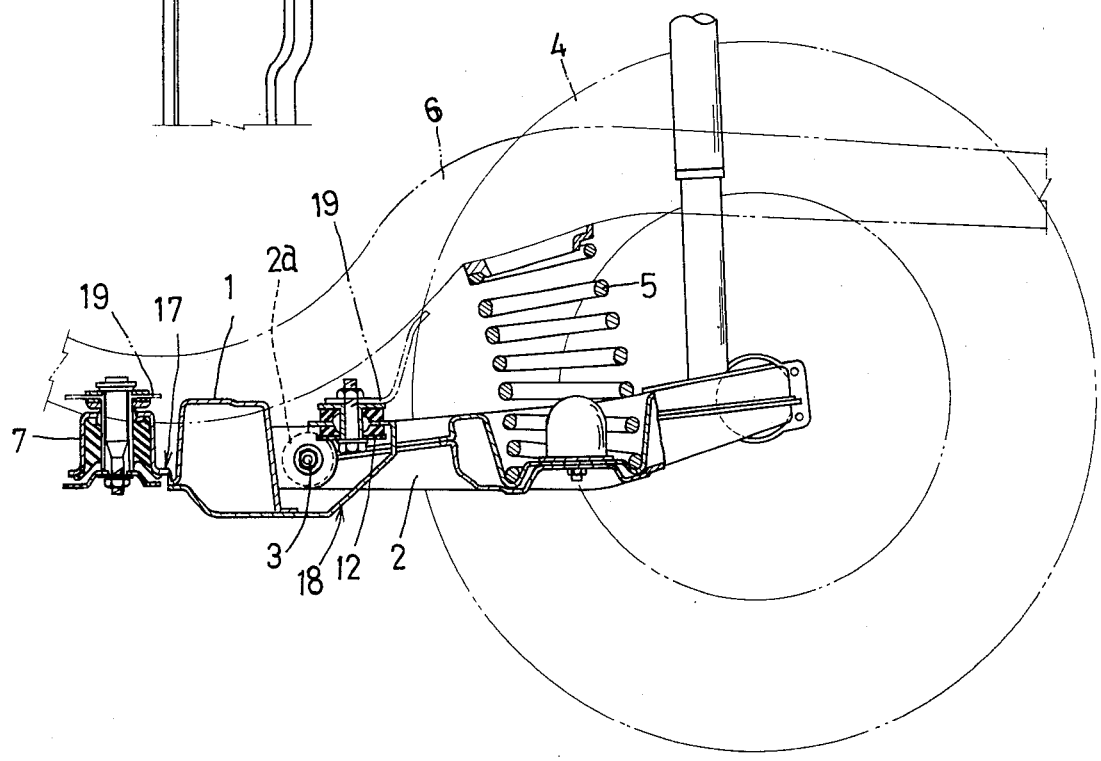

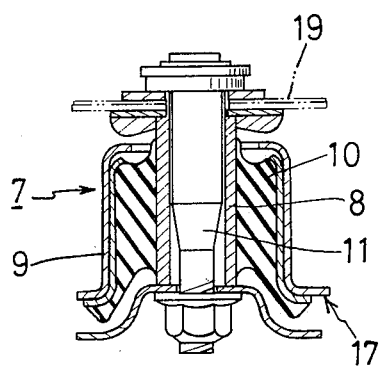
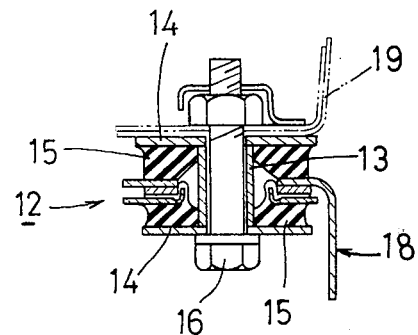
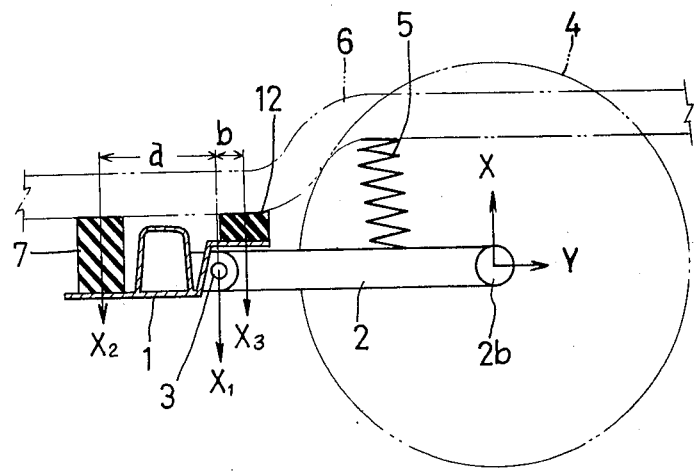

SUPPORTING STRUCTURE FOR A SUSPENSION MEMBER FOR A VEHICLE

BACKGROUND OF THE INVENTION

1. Field of the Invention

This invention relates to an independent wheel suspension for a vehicle, and more particularly, to a supporting structure for a suspension member having a front cushion and a rear cushion for protection against shock to the body of the vehicle.

2. Description of the Prior Art

Two types of cushions are usually used for such a wheel suspension. They are shear type and compression type. A shear type cushion, however, provides only a small spring rate against the load acting longitudinally and vertically on the vehicle. A shear type cushion is particularly unsatisfactory for use on the rear side where the influence of a vertical load presents a significant problem. The cushion is not durable enough for use in such application. In order to solve this problem, it is necessary to employ a cushion having a considerably large volume.

A compression type cushion advantageously exhibits a sufficiently large spring rate to comply with a vertical load on the vehicle. It provides a relatively large spring rate against the load acting longitudinally on the vehicle. This results in a reduced compliance of the suspension with the longitudinal load, which makes the vehicle less comfortable to ride in. In order to provide a solution to this problem, it is necessary to use a cushion having a large volume to lower its spring rate.

SUMMARY OF THE INVENTION

It is an object of this invention to provide a supporting structure for a suspension member having a small volume and yet capable of fully absorbing shock against a vertical load on a vehicle.

It is another object of this invention to provide a supporting structure for a suspension member having a high compliance with the load acting longitudinally on a vehicle to thereby make the vehicle comfortable to ride in.

BRIEF DESCRIPTION OF THE DRAWINGS

FIG. 1 is a top plan view of a rear wheel suspension in which this invention is employed;

FIG. 2 is a vertical sectional view taken on the line II—II of FIG. 1;

FIG. 3 is an enlarged vertical sectional view of the front cushion shown in FIG. 2;

FIG. 4 is an enlarged vertical sectional view of the rear cushion shown in FIG. 2; and FIG. 5 is a schematic view similar to FIG. 2 illustrating the distribution of load to the suspension.

DESCRIPTION OF THE PREFERRED EMBODIMENT

Referring to FIGS. 1 and 2 of the drawings, there is shown a trailing arm type rear wheel suspension in which the present invention is employed. The suspension comprises a suspension member 1 and a suspension arm 2 having a pair of connecting portions 2a at which the arm 2 is connected to the suspension member 1 by pivot bolts 3. The arm 2 is provided at its end remote from the suspension member 1 with a spindle 2b on which a wheel 4 is supported. A coil spring 5 is connected between the arm 2 and a floor side member 6.

The suspension further includes a front cushion 7 and a rear cushion 12. The front cushion 7 is supported by a part 19 of the vehicle body and a bracket 17 provided on the front edge of the suspension member 1. The rear cushion 12 is supported by the part 19 of the body and a bracket 18 provided on the rear edge of the suspension member 1. Referring particularly to FIG. 3, the front cushion 7 is a shear type cushion having an inner cylinder 8, an outer cylinder 9 and a cushion member 10 of elastic material, such as rubber, fitted between the inner and outer cylinders 8 and 9. The inner and outer cylinders 8 and 9 are made of metal and the like. The cushion member 10 is secured by fusing to the inner and outer cylinders 8 and 9. The inner cylinder 8 is secured to the part 19 of the body by a bolt 11. The outer cylinder 9 is integrally connected to the bracket 17 on the suspension member 1.

As shown in FIG. 4, the rear cushion 12 is a compression type cushion having central bush 13 surrounded by an elastic member 15. The bush 13 and the elastic member 15 are supported by a pair of discs 14 at their upper and lower ends. The discs 14 are secured to the part 19 of the body by a bolt 16. The elastic member 15 is supported by one end of the bracket 18.

As is generally known, a shear type cushion such as employed at 7 in FIG. 3 exhibits a considerably small spring rate against a vertical load on the vehicle, and also a small spring rate against a load acting longitudinally on the vehicle. A compression type cushion, such as employed at 12 in FIG. 4, shows a considerably large spring rate against a vertical load on the vehicle, and a medium spring rate against a load acting longitudinally on the vehicle.

Attention is now directed to FIG. 5, in which the letter X denotes a vertical load acting from the road surface to the spindle 2b on the arm 2 through the wheel 4. The load X is transmitted to the floor side member 6 through the coil spring 5, while it is also transmitted to the pivot bolts 3 on the arm 2 as a load $X_1$ about the coil spring 5. The load $X_1$ acts on the front and rear cushions 7 and 12 as indicated at $X_2$ and $X_3$, respectively. If the distance a between the center of the pivot bolt 3 and the center of the front cushion 7 is greater than the distance b between the center of the pivot bolt 3 and that of the rear cushion 12, the load $X_3$ is greater than the load $X_2$. In other words, a greater part of the vertical load on the vehicle acts on the rear cushion 12 than on the front cushion 7. The rear cushion 12 is small in volume and yet can fully absorb the load $X_3$, because it is a compression type cushion having a considerably large spring rate against a vertical load on the vehicle as hereinbefore described.

Referring again to FIG. 5, the letter Y denotes a load acting on the spindle 2b longitudinally of the vehicle. The load Y acts on the front and rear cushions 7 and 12 through the pivot bolts 3 on the arm 2 and the suspension member 1 in a direction which is transverse to the cushions 7 and 12 or perpendicular to the bolts 11 and 16. As both the front and rear cushions 7 and 12 show a relatively small spring rate when viewed in their transverse direction, the suspension provides a higher compliance with the longitudinally acting load Y.

Although the invention has been described with reference to a preferred embodiment thereof, it is to be understood that modifications or variations may be readily made by those skilled in the art without departing from the spirit and scope of this invention as defined by the appended claims.

What is claimed is:

1. A supporting structure for a transversely extending suspension member on a vehicle, comprising a trailing arm pivotally connected to said suspension member and connected to a wheel of said vehicle, a front cushion and a rear cushion which resiliently support said suspension member on the body of said vehicle, said front cushion having a small spring rate against a load acting longitudinally on said vehicle and a vertical load on said vehicle, and said rear cushion having a large spring rate against said vertical load, wherein said rear cushion is horizontally positioned closer to the pivot point between said suspension member and said trailing arm than is said front cushion.

2. A supporting structure for a suspension member on a vehicle as defined in claim 1, wherein said front cushion is a shear type cushion.

3. A supporting structure for a suspension member on a vehicle as defined in claim 1 or 2, wherein said rear cushion is a compression type cushion.

4. A supporting structure for a suspension member on a vehicle as defined in claim 1, wherein said front cushion is a shear type cushion, and said rear cushion is a compression type cushion.

5. A supporting structure for a suspension member on a vehicle as defined in claim 4, wherein said suspension member is provided with a pair of brackets on which said front and rear cushions are mounted.

* * * * *

UNITED STATES PATENT AND TRADEMARK OFFICE
CERTIFICATE OF CORRECTION

PATENT NO. : 4,257,623

DATED : March 24, 1981

INVENTOR(S) : Mitsuo Kawase et al.

It is certified that error appears in the above-identified patent and that said Letters Patent is hereby corrected as shown below:

On the Title Page, Item [73]

--Assignee information is incorrectly recorded.
It should read:
Toyota Jidosha Kogyo Kabushiki Kaisha, Toyota Japan--

Signed and Sealed this

Seventeenth Day of May, 1988

*Attest:*

DONALD J. QUIGG

*Attesting Officer*     *Commissioner of Patents and Trademarks*